US012803186B2

(12) United States Patent
Chen

(10) Patent No.: US 12,803,186 B2
(45) Date of Patent: Nov. 17, 2026

(54) MOTOR TERMINAL CONNECTOR WITH SERRATED ELASTIC CANTILEVERS AND PIERCING PROTRUSION

(71) Applicant: Chun-Jui Chen, Tainan (TW)

(72) Inventor: Chun-Jui Chen, Tainan (TW)

( * ) Notice: Subject to any disclaimer, the term of this patent is extended or adjusted under 35 U.S.C. 154(b) by 360 days.

(21) Appl. No.: 18/611,362

(22) Filed: Mar. 20, 2024

(65) Prior Publication Data

US 2025/0023258 A1 Jan. 16, 2025

(30) Foreign Application Priority Data

Jul. 13, 2023 (CN) ........................ 202321839075.X

(51) Int. Cl.
*H01R 4/2425* (2018.01)

(52) U.S. Cl.
CPC .................................. *H01R 4/2425* (2013.01)

(58) Field of Classification Search
CPC ...... H01R 4/2425; H01R 12/585; H01R 4/48; H01R 4/2429; H01R 4/484; H01R 4/4848; H01R 4/2452; H01R 11/05; H01R 13/05; H01R 13/11; H01R 4/242; H01R 12/515; H01R 13/2442; H01R 13/4223; H01R 13/504; H01R 4/4823; H01R 4/26; H01R 4/2462; H01R 4/2466
See application file for complete search history.

(56) References Cited

U.S. PATENT DOCUMENTS

| | | | | | |
|---|---|---|---|---|---|
| 4,153,324 | A * | 5/1979 | Kukla | H01R 4/2466 | 439/406 |
| 4,391,484 | A * | 7/1983 | Foederer | H01R 12/515 | 439/404 |
| 5,378,171 | A * | 1/1995 | Czerlanis | H01R 4/242 | 439/417 |
| 7,644,541 | B2 * | 1/2010 | Piovesan | H01R 4/2425 | 49/395 |
| 9,209,529 | B2 * | 12/2015 | Magno | H02S 40/30 | |
| 10,770,820 | B2 * | 9/2020 | Huang | H01R 13/05 | |
| 2008/0205020 | A1 * | 8/2008 | Vich | H01R 4/26 | 361/813 |

* cited by examiner

*Primary Examiner* — Edwin A. Leon

(57) ABSTRACT

A motor terminal connector includes a main body having a board end and a wiring end. A pin extends from the board end. The wiring end defines a receiving slot having an opening and two elastic cantilevers on opposite sides of the opening. Each cantilever has a root connected to a sidewall and a free end extending toward an inner bottom with a gap therebetween. The free ends approach one another to clamp an enameled wire and carry facing serrations configured to pierce enamel of the enameled wire. A piercing protrusion at the inner bottom extends toward opposite sides of the opening and has a blade-shaped top. The free ends extend toward a central portion of the piercing protrusion. The blade-shaped top pierces enamel of the wire from a third side and cooperates with the serrations to form a three-sided electrically conductive connection.

20 Claims, 5 Drawing Sheets

MOTOR TERMINAL CONNECTOR WITH SERRATED ELASTIC CANTILEVERS AND PIERCING PROTRUSION

CROSS REFERENCE TO RELATED APPLICATION

The present application claims priority to CN Patent Application Serial No. 202321839075X, filed on Jul. 13, 2023, which is hereby incorporated by reference in their entirety.

FIELD

This disclosure is relating to the field of electrical connectors, particularly to a type of motor terminal connector.

BACKGROUND

Motor terminal connectors are connected to wires through soldering, riveting, or piercing methods, with the piercing method being commonly used for its convenience and efficiency. Piercing-type connections are made by piercing through the enamel of enameled wires to establish an electrical connection between the terminal and the conductor, where the enameled wire consists of an outer enamel layer and an inner conductor. However, existing terminals mainly penetrate the enameled wire with protruding teeth or blade-like cuts, piercing the enamel and blocking it outside the terminal. These methods often leave residual enamel that hinders the terminal from fully entering the interior of the enameled wire, causing incomplete contact between the terminal and conductor, leading to high contact resistance and affecting work efficiency.

SUMMARY OF THE DISCLOSURE

The objective of this utility is to provide a novel motor terminal connector that enhances the reliability of the electrical connection between the piercing terminal and the enameled wire.

To achieve this objective, the utility adopts the following technical solution:

A motor terminal connector, comprises a main body, the main body having aboard end and a wiring end, the board end is disposed with a pin for board connection, and the wiring end is disposed with a receiving slot; the receiving slot comprises an opening distal from the pins, and two elastic cantilevers are disposed on both sides of the opening, each having a root and a free end, the root of the two elastic cantilevers is connected to a sidewall of the opening, while the free end of the elastic cantilevers extends towards the inner bottom of the receiving slot, leaving a gap with the inner bottom, and the free ends of the two elastic cantilevers gradually approach each other as they extend; the two elastic cantilevers are used to clamp an enameled wire, and serrations are disposed on the opposing facing sides of the two elastic cantilevers, where the serrations are used to press and pierce the enamel of the enameled wire, thereby enabling the two elastic cantilevers to clamp the enameled wire and form an electrical conductive connection; the receiving slot provides space for the elastic movement of the two elastic cantilevers when clamping the enameled wire.

In some embodiments, on each one of the two elastic cantilevers, the serrations are multi-toothed and disposed along the extension direction of the two elastic cantilevers, and the distance from the extended end of the free end of the elastic cantilever to the nearest serration is greater than or equal to the outer diameter of the enameled wire.

In some embodiments, the inner bottom of the receiving slot is disposed with a piercing protrusion, and the free ends of the two elastic cantilevers extend towards the central part of the piercing protrusion.

In some embodiments, the elastic cantilever is integrally formed with the main body, with the root of the elastic cantilever extending from the sidewall of the opening of the receiving slot, and the outer side of the root of the elastic cantilever is disposed with a concave arc portion to increase elasticity.

In some embodiments, the pin is of a fish-eye shape, and an expansion part is provided inside the pin.

In some embodiments, the expansion part is a concave slot or a through-hole penetrating the pin.

In some embodiments, the two elastic cantilevers are symmetrical to each other.

In some embodiments, the piercing-type terminal connector is made from a single piece of metal plate by punching or by a molding process, the outside of the wiring end of the main body is disposed with barbs, and the barbs are used for connecting to a corresponding plastic case, enabling the main body to be inserted into the plastic case to achieve an anti-loose connection.

This utility model provides a novel motor terminal connector suitable for board-to-wire connections, with pins conveniently connecting to the board; the receiving slot is suitable for inserting enameled wires, and elastic cantilevers are disposed on both sides of the opening of the receiving slot. The free ends of the two elastic cantilevers gradually approach each other as they extend, providing optimal clamping elasticity for holding the enameled wire, with serrations on the opposing sides of the cantilevers to press and pierce the enamel of the enameled wire. In use, the serrations press and pierce the enamel of the enameled wire, pushing away the pierced enamel, allowing the two elastic cantilevers to effectively clamp the enameled wire, avoiding the influence of the enamel and obtaining great electrical conductive connection performance, and the two elastic cantilevers continuously clamp the enameled wire with elasticity, ensuring the stability.

DETAILED DESCRIPTION

Figure 1:
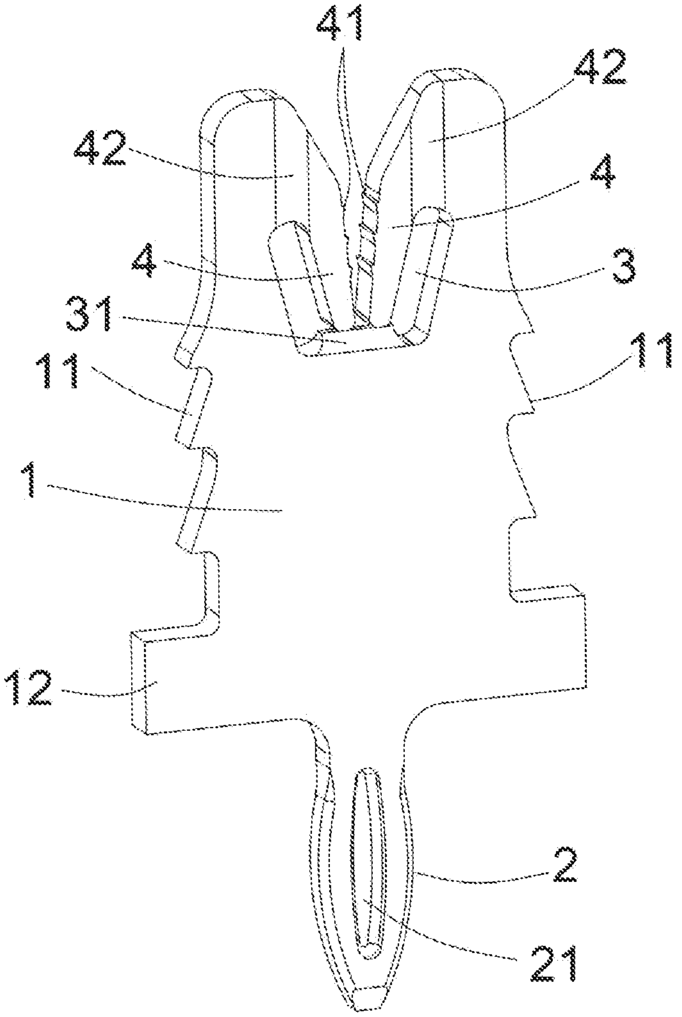
FIG. 1 is a schematic diagram of the structure of this disclosure.

The following description, in conjunction with the accompanying drawings, further explains the conception, specific structure, and technical effects of this utility model, to fully understand its objectives, features, and effects.

It should be noted that in the description of this disclosure, terms indicating direction or positional relationships such as “upper”, “lower”, “left”, “right”, “vertical”, “horizontal”, “inner”, “outer”, etc., are based on the directions or positional relationships shown in the drawings. These terms are used merely for convenience in description and do not imply that the described devices or elements must have a specific orientation, be constructed and operated in a specific orientation, and therefore should not be considered as limiting to this disclosure. Moreover, terms like “first”, and “second” are used only for descriptive purposes and should not be construed as indicating or implying relative importance.

Figure 2:
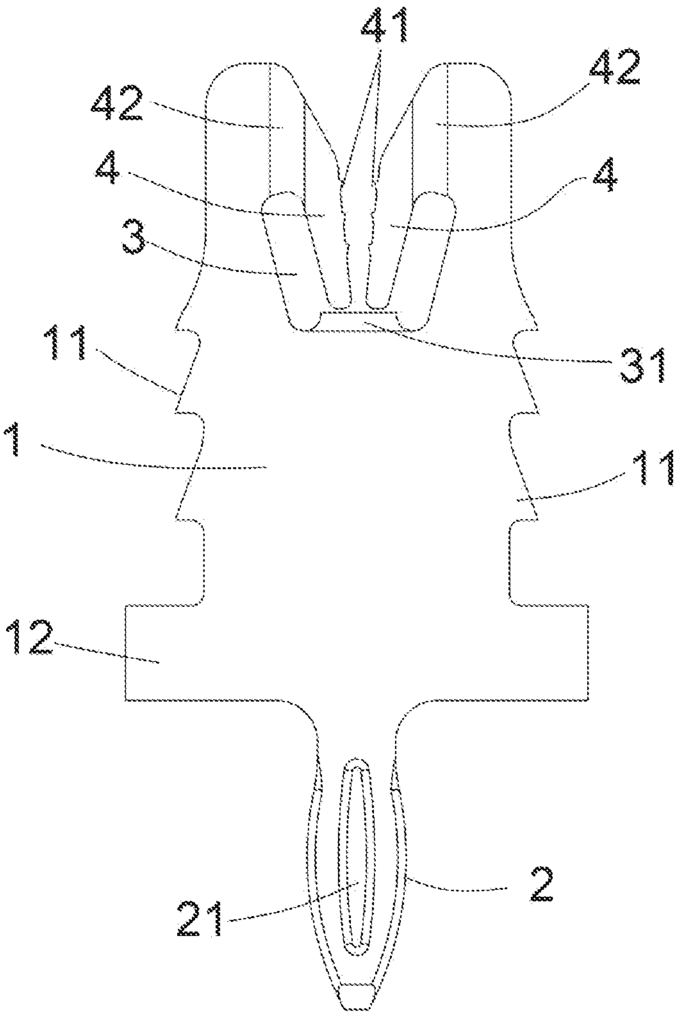
FIG. 2 is a front structural schematic diagram of the embodiment shown in FIG. 1.
Figure 3:
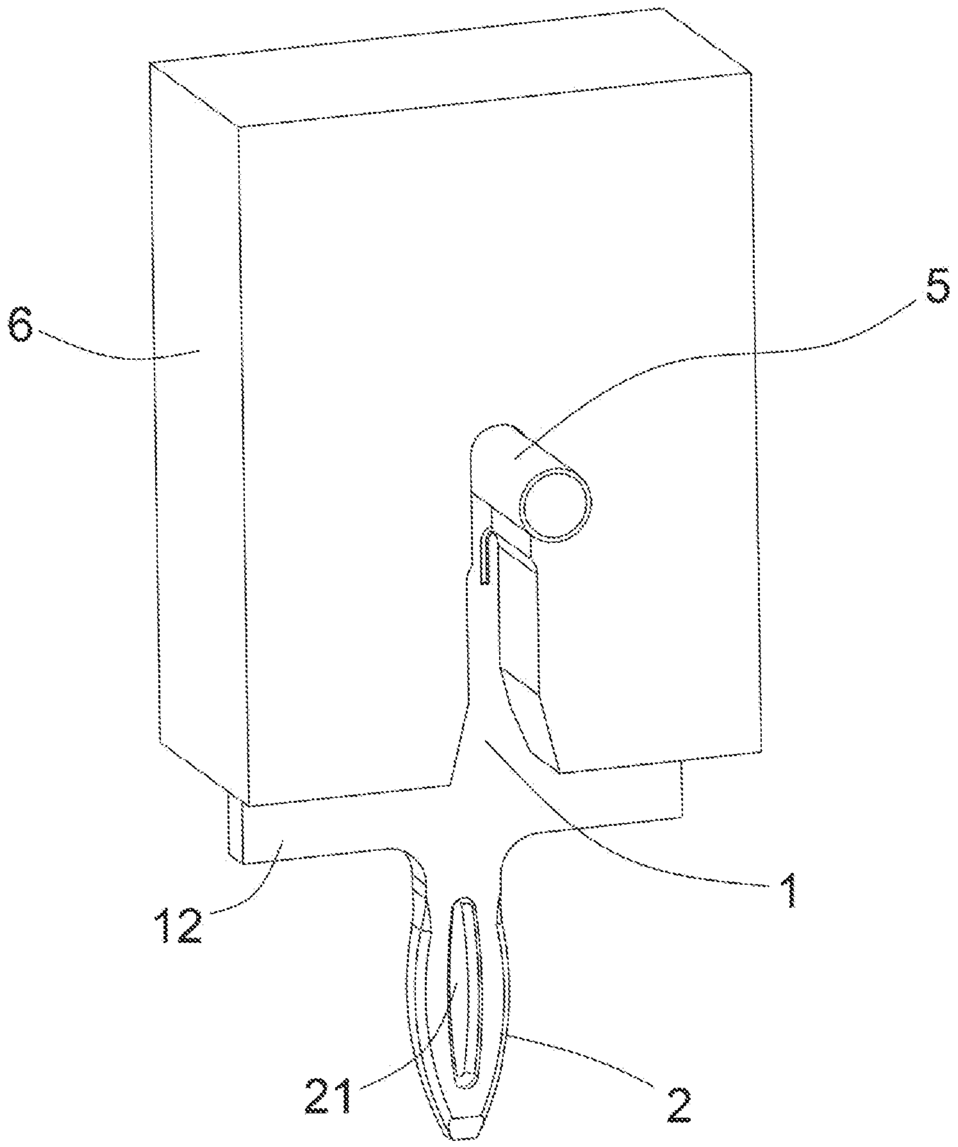
FIG. 3 is a schematic diagram showing the connection of enameled wire with a plastic case in the embodiment of FIG. 1.
Figure 4:
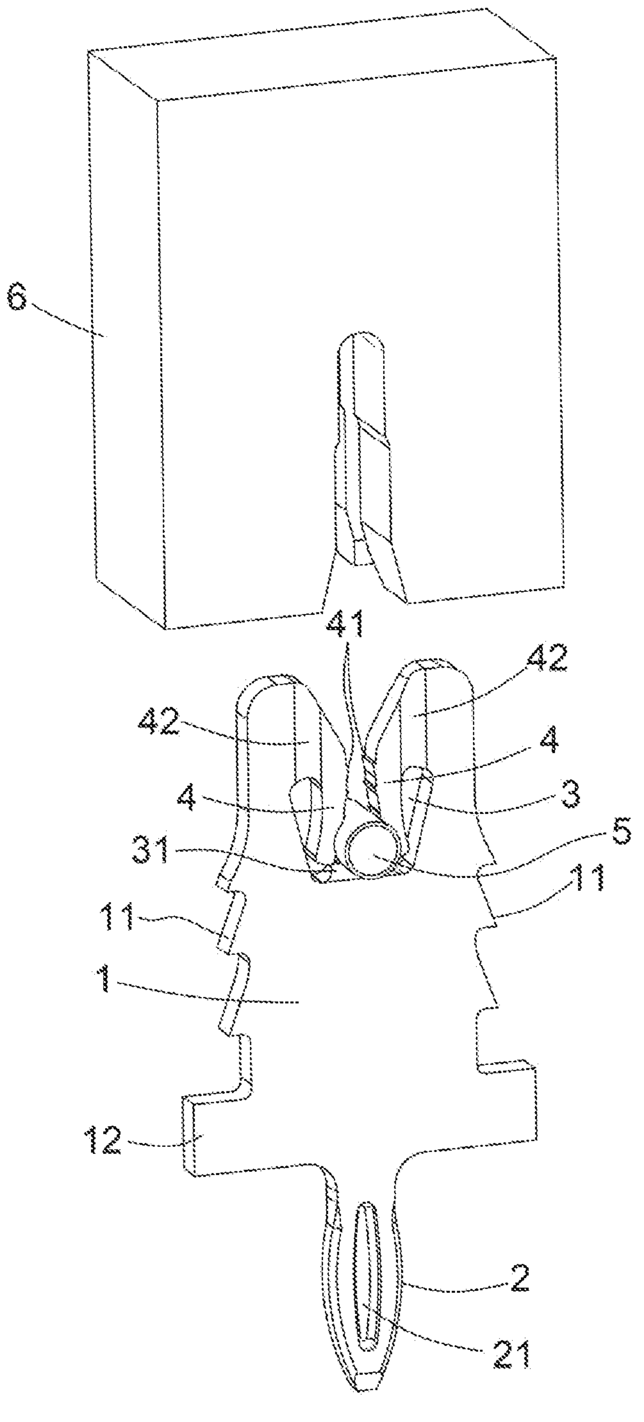
FIG. 4 is a partial structural exploded view of the embodiment shown in FIG. 3.
Figure 5:
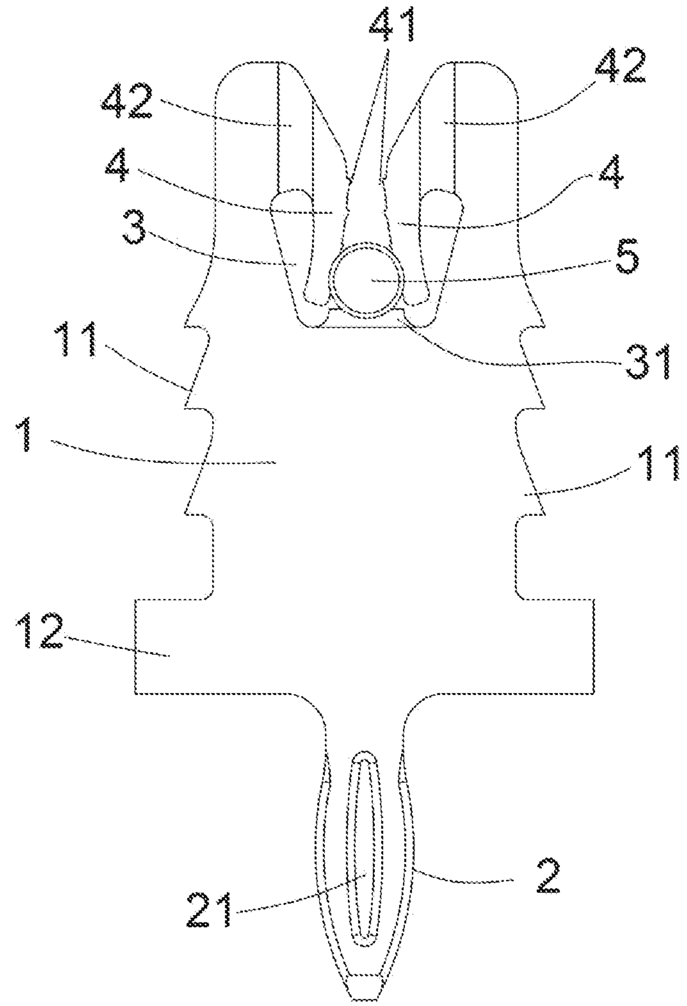
FIG. 5 is a front structural schematic diagram after the piercing connection of this disclosure.

According to FIGS. 1, 2, 3, 4, and 5, which show schematic diagrams of a preferred embodiment of this disclosure, it relates to a novel motor terminal connector comprising a main body 1. The main body 1 has aboard end and a wiring end, with a separating stop protrusion 12 disposed between the board end and the wiring end. When the wiring end is connected with a corresponding plastic case 6, the wiring end is inserted into the plastic case 6. The separating stop protrusion 12 is used to restrict and stop, thereby effectively limiting the insertion depth and enhancing the stability of the connection to prevent wobbling. The board end is disposed with pin 2 for board connection. In this embodiment, the pin 2 are preferably fish-eye shaped, and an expansion part 21 is disposed inside the pin 2. This expansion part 21 is preferably a concave slot or a through-hole penetrating the pin 2, utilizing the characteristics of the expansion part 21 to facilitate the insertion of the pin 2 into the PCB board and significantly reduce the stress on the PCB board connection holes, maintaining constant terminal orthogonality, enhancing connection stability, and reducing the need for soldering processes.

The wiring end of the main body 1 is disposed with a receiving slot 3. This receiving slot 3 has an opening away from the pins, and elastic cantilevers 4 are disposed on both sides of this opening. Each elastic cantilever 4 has a root and a free end. The root of the elastic cantilever 4 is connected to the sidewall of the opening, while its free end extends towards the inner bottom of the receiving slot, leaving a gap with the inner bottom, and the free ends of the two elastic cantilevers 4 gradually approach each other as they extend, creating an original space for elastic clamping. The two elastic cantilevers 4 are used to clamp enameled wire 5, and serrations 41 are disposed on the opposing sides of the two elastic cantilevers 4. The direction of the teeth of the serrations 41 is opposite to the extension direction of the free ends of the elastic cantilevers 4. Thus, the serrations 41 can press and pierce the enamel of the enameled wire 5 and automatically push out the enamel, enabling the two elastic cantilevers 4 to clamp the enameled wire 5 and form an electrical conductive connection. The enameled wire 5 is confined within the triangular space formed by the two elastic cantilevers 4 and the inner bottom of the receiving slot. The gap between the free ends of the clastic cantilevers 4 and the inner bottom of the receiving slot provides sufficient space for the elastic movement of the cantilevers 4 in the receiving slot 3, satisfying the requirements for clamping the wire without the risk of the enameled wire escaping from this triangular space. The receiving slot 3 provides space for the elastic movement of the two elastic cantilevers 4 when clamping the enameled wire 5. In the clamping state, the free ends of the elastic cantilevers 4 bend towards the walls of the receiving slot 3.

In this embodiment, a piercing protrusion 31 can further be disposed at the inner bottom of the receiving slot 3. The free ends of the two elastic cantilevers 4 extend towards the central part of this piercing protrusion 31, achieving a three-sided enclosure effect on the enameled wire. The piercing protrusion 31 in the figure extends towards both sides of the opening of the receiving slot 3, obtaining a corresponding length. This length is preferably greater than or equal to the outer diameter of the enameled wire 5, and the top of the piercing protrusion 31 preferably forms a blade-like shape to pierce into the enameled wire 5 from the corresponding side and form a conductive connection. This, combined with the connection of the enameled wire 5 by the two elastic cantilevers 4, achieves a three-sided conductive connection effect, enhancing electrical conductivity.

In this embodiment, the elastic cantilevers 4 are integrally formed with the main body 1, and the two elastic cantilevers 4 are symmetrical, achieving optimal clamping force and ensuring wire clamping stability. The root of the elastic cantilever 4 is constructed by extending from the sidewall of the opening of the receiving slot, and the outer side of the root of the elastic cantilever 4 is disposed with a concave arc section 42 to enhance the working performance of the clastic cantilever 4. The serrations 41 on each elastic cantilever 4 are multi-toothed and spaced along the extension direction of the cantilever 4, and the distance from the extended end of the free end of the cantilever 4 to the nearest serration 41 is greater than or equal to the outer diameter of the enameled wire 5, so that the serrations 41 can pierce the enameled wire and also remove the enamel, ensuring that the free end of the elastic cantilever 4 effectively avoids the influence of the enamel when clamping the enameled wire, obtaining good electrical conductive connection performance.

In this embodiment, the piercing-type terminal connector is either made from a single piece of metal plate by stamping or a single metal terminal made by a molding process. The wiring end of the main body 1 is disposed with barbs 11, which are used for connecting to a corresponding plastic case 6, enabling the main body 1 to be inserted into the plastic case 6 to achieve an anti-loose connection. During operation, the plastic case 6 is fixed, with predetermined terminal slots and wire slots that cross the terminals on the plastic case 6. First, the enameled wire is placed in the wire slot, and then the wiring end of the piercing-type terminal connector of this utility model is pressed into the predetermined terminal slot on the plastic case 6. During this pressing process, the serrations 41 on the two elastic cantilevers 4 press and pierce the enamel of the enameled wire 5 and automatically push out the enamel, enabling the two clastic cantilevers 4 to clamp the enameled wire 5 and form an electrical conductive connection. If the inner bottom of the receiving slot 3 is disposed with a piercing protrusion 31, the piercing protrusion 31 will also pierce the enameled wire from the corresponding side and form an electrical connection following the pressing force.

This utility model provides a piercing-type terminal connector suitable for board-to-wire connections, with a pin conveniently connecting to the board; the receiving slot is suitable for inserting enameled wires, and elastic cantilevers are disposed on both sides of the opening of the receiving slot. The free ends of the two elastic cantilevers gradually approach each other as they extend, providing optimal clamping elasticity for holding the enameled wire, with serrations on the opposing sides of the cantilevers to press and pierce the enamel of the enameled wire. In use, the serrations press and pierce the enamel of the enameled wire, pushing away the pierced enamel, allowing the two clastic cantilevers to effectively clamp the enameled wire, avoiding the influence of the enamel and obtaining good electrical conductive connection performance, and the two elastic cantilevers continuously clamp the enameled wire with elasticity, ensuring stability.

Although the preferred specific embodiments of this utility model have been described in conjunction with the accompanying drawings, the utility model should not be limited to the exact structure and operation fully identical to the description and drawings. For those skilled in the art, logical analysis, reasoning, or limited experimentation can lead to many equivalent modifications and variations to the aforementioned embodiments without departing from the conception and scope of this utility model, and these modifications and variations should fall within the scope of protection demanded by this utility model.

The invention claimed is:

1. A motor terminal connector, characterized in that it comprises a main body (1), the main body (1) having a board end and a wiring end, the board end is disposed with a pin (2) for board connection, and the wiring end is disposed with a receiving slot (3);

the receiving slot (3) comprises an opening distal from the pin (2), and two elastic cantilevers (4) are disposed on opposite sides of the opening, each elastic cantilever (4) having a root and a free end, the root of each elastic cantilever (4) being connected to a corresponding sidewall of the opening, the free end of each elastic cantilever (4) extending toward an inner bottom of the receiving slot (3), with a gap between the free end and the inner bottom, the free ends of the two elastic cantilevers (4) gradually approaching each other as the free ends extend toward the inner bottom;

the two elastic cantilevers (4) are used to clamp an enameled wire (5), and serrations (41) are disposed on the facing sides of the two elastic cantilevers (4), where the serrations (41) are used to press and pierce the enamel of the enameled wire (5), thereby enabling the two elastic cantilevers (4) to clamp the enameled wire (5) and form an electrically conductive connection;

the receiving slot (3) provides space for the elastic movement of the two elastic cantilevers (4) when clamping the enameled wire (5); and a piercing protrusion (31) disposed at the inner bottom of the receiving slot (3), the piercing protrusion (31) extending toward two opposite sides of the opening and having a blade-shaped top, wherein the free ends of the two elastic cantilevers (4) extend toward a central portion of the piercing protrusion (31), and wherein the blade-shaped top is configured to pierce the enameled wire (5) from a third side of the enameled wire (5) different from the two sides of the enameled wire (5) pierced by the serrations (41), such that the blade-shaped top and the serrations (41) form a three-sided electrically conductive connection with the enameled wire (5).

2. A motor terminal connector according to claim 1, characterized in that, wherein the serrations (41) on each of the two elastic cantilevers (4) comprise multiple teeth arranged along an extension direction of the corresponding elastic cantilever (4), and a distance from a distal end of each elastic cantilever (4) to the serration (41) nearest the distal end is greater than or equal to an outer diameter of the enameled wire (5).

3. A motor terminal connector according to claim 1, characterized in that, wherein the piercing protrusion (31) has a length measured along a direction between the two opposite sides of the opening, the length being greater than or equal to an outer diameter of the enameled wire (5).

4. A motor terminal connector according to claim 1, characterized in that, each of the two elastic cantilevers (4) is integrally formed with the main body (1), the root of each elastic cantilever (4) extends from the corresponding sidewall of the opening, and an outer side of the root of each elastic cantilever (4) has a concave arc portion (42) configured to increase elasticity.

5. A motor terminal connector according to claim 1, characterized in that, the pin (2) is of a fish-eye shape, and an expansion part (21) is provided inside the pin (2).

6. A motor terminal connector according to claim 5, characterized in that, the expansion part (21) is a concave slot or a through-hole penetrating the pin (2).

7. A motor terminal connector according to claim 1, characterized in that, the two elastic cantilevers (4) are symmetrical to each other.

8. A motor terminal connector according to claim 1, characterized in that, wherein the motor terminal connector is formed from a single piece of metal plate by punching or is formed as a single metal terminal by a molding process, an outer side of the wiring end is provided with barbs (11), and the barbs (11) are configured to engage a corresponding plastic case (6) to provide an anti-loosening connection when the wiring end is inserted into the plastic case (6).

9. A motor terminal connector according to claim 1, characterized in that, wherein a tooth direction of the serrations (41) on each elastic cantilever (4) is opposite to a direction in which the free end of the corresponding elastic cantilever (4) extends from the root toward the inner bottom of the receiving slot (3).

10. A motor terminal connector according to claim 9, characterized in that, wherein the two elastic cantilevers (4) and the inner bottom of the receiving slot (3) define a triangular confinement space configured to confine the enameled wire (5), and the gaps between the free ends and the inner bottom provide elastic-movement space for the two elastic cantilevers (4).

11. A motor terminal connector according to claim 10, characterized in that, wherein, in a state in which the enameled wire (5) is clamped, the free ends of the two elastic cantilevers (4) bend toward respective walls of the receiving slot (3).

12. A motor terminal connector according to claim 9, characterized in that, wherein the serrations (41) on each elastic cantilever (4) comprise multiple teeth arranged along an extension direction of the corresponding elastic cantilever (4), and a distance from a distal end of each elastic cantilever (4) to the serration (41) nearest the distal end is greater than or equal to an outer diameter of the enameled wire (5).

13. A motor terminal connector according to claim 9, characterized in that, wherein each elastic cantilever (4) has a root extending from a corresponding sidewall of the opening, the two elastic cantilevers (4) are integrally formed with the main body (1), an outer side of each root has a concave arc portion (42), and the two elastic cantilevers (4) are symmetrical to each other.

14. A motor terminal connector according to claim 9, characterized in that, wherein the pin (2) has a fish-eye shape and includes an expansion part (21) formed as a through-hole penetrating the pin (2).

15. A motor terminal connector according to claim 1, characterized in that, the wiring end of the main body (1) is received in a terminal slot defined by a plastic case (6), the plastic case (6) further defining a wire slot crossing the terminal slot;

the enameled wire (5) is positioned in the wire slot and extends through the receiving slot (3) between the two elastic cantilevers (4), the two elastic cantilevers (4) clamp the enameled wire (5), and the serrations (41) contact and pierce enamel of the enameled wire (5);

a separating stop protrusion (12) is disposed between the board end and the wiring end and limits an insertion depth of the wiring end into the terminal slot; and barbs (11) disposed on an outer side of the wiring end engage the plastic case (6) to resist withdrawal of the wiring end from the terminal slot.

16. A motor terminal connector according to claim 15, characterized in that, the motor terminal connector is formed from a single piece of metal plate by punching or is formed as a single metal terminal by a molding process.

17. A motor terminal connector according to claim 15, characterized in that, each elastic cantilever (4) has a root extending from a corresponding sidewall of the opening, the two elastic cantilevers (4) are integrally formed with the main body (1), an outer side of each root has a concave arc portion (42), and the two elastic cantilevers (4) are symmetrical to each other.

18. A motor terminal connector according to claim 15, characterized in that, the pin (2) has a fish-eye shape and includes an expansion part (21) formed as a through-hole penetrating the pin (2).

19. A motor terminal connector according to claim 15, characterized in that, the piercing protrusion (31) has a length measured along a direction between the two opposite sides of the opening, the length being greater than or equal to an outer diameter of the enameled wire (5).

20. A motor terminal connector according to claim 15, characterized in that, a tooth direction of the serrations (41) on each elastic cantilever (4) is opposite to a direction in which the free end of the corresponding elastic cantilever (4) extends from the root toward the inner bottom of the receiving slot (3);

the two elastic cantilevers (4) and the inner bottom of the receiving slot (3) define a triangular confinement space configured to confine the enameled wire (5); and in a state in which the enameled wire (5) is clamped, the free ends of the two elastic cantilevers (4) bend toward respective walls of the receiving slot (3).

* * * * *